Sept. 26, 1950     F. V. SCHLEIMER     2,523,669
CONTACT PRINTER HAVING SPRING URGED NEGATIVE HOLDER
Filed Sept. 15, 1947
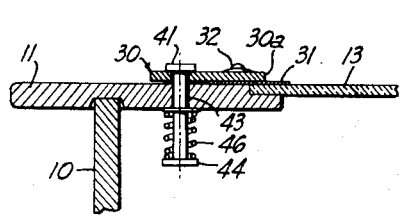
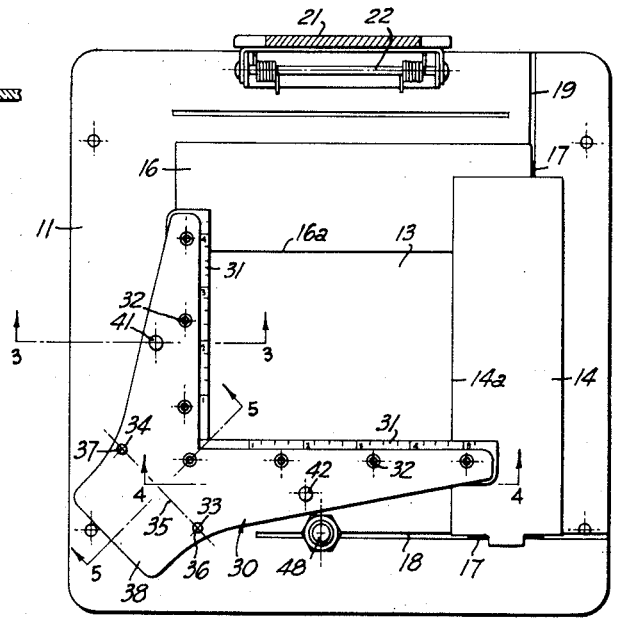
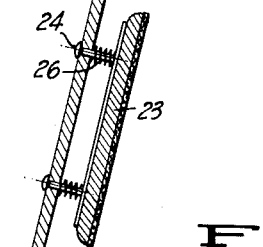
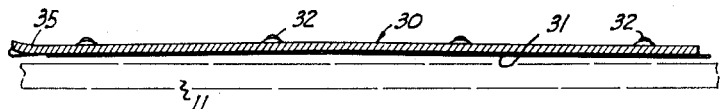
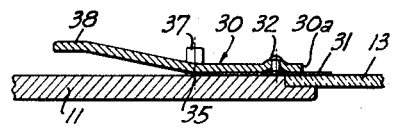
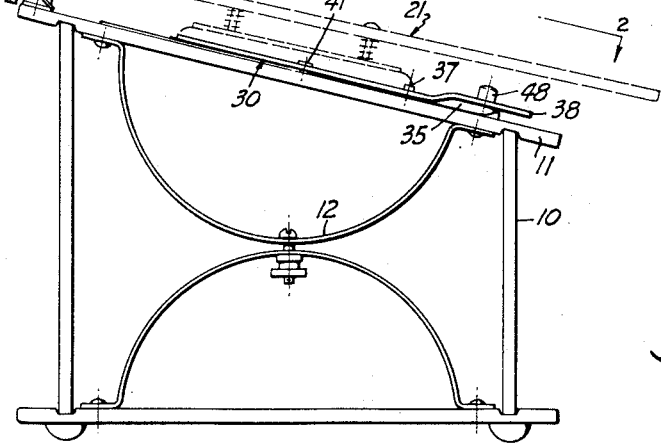
INVENTOR
Floyd V. Schleimer
BY
Flehr & Swain
ATTORNEYS Patented Sept. 26, 1950

2,523,669

UNITED STATES PATENT OFFICE 2,523,669

CONTACT PRINTER HAVING SPRING URGED NEGATIVE HOLDER

Floyd V. Schleimer, San Francisco, Calif.

Application September 15, 1947, Serial No. 773,957

4 Claims. (Cl. 95—73)

This invention relates to photographic printers and particularly to that type of printer known as a "contact" printer in which a piece of light sensitive photographic paper is placed in contact with a negative for a predetermined period of time.

It is an object of the present invention to provide such a printer which is simple to operate.

It is a further object of the present invention to provide a printer of the character described in which the negative may be held in a predetermined position and the photographic paper placed thereover with the minimum opportunity for mistake or error.

It is a further object of the invention to provide a photographic printer of the character described in which the margin of the finished picture may be easily and accurately predetermined.

It is a further object of the present invention to provide a photographic printer of the character described in which the negative may be retained in a predetermined position and yet may be released by the most simple operation.

Further objects and advantages of the present invention will appear from the following description taken in conjunction with the accompanying drawings in which:

Figure 1 is a side elevational view of a photographic printer showing my invention;

Figure 2 is a top plan view taken along the line 2—2 of Figure 1;

Figure 3 is a fragmentary detail taken along the line 3—3 of Figure 2;

Figure 4 is a fragmentary detail taken along the line 4—4 of Figure 2; and

Figure 5 is a fragmentary detail taken along the line 5—5 of Figure 2.

As shown in Figure 1 my photographic printer consists of a box-like member 10 in which are mounted suitable lights, not shown, and which is provided with a sloping top 11 which is generally maintained in the position shown by means of the fastening devices 12.

The sloping top portion 11 is provided with a light diffusing window 13 of translucent material, such as ground glass, which provides a light diffusing surface upon which the negative may be placed as is customary in such photographic printers. The top 11 is likewise provided with a pair of slidable margin devices 14 and 16 which are provided with turned-down portions (not shown) and springs 17 which cooperate with grooves 18 and 19 upon the upper surface of member 11. The members 14 and 16 may be slid longitudinally and transversely along grooves 18 and 19 respectively, to determine the size of the light emitting diffusing surface 13.

A swinging member 21 is provided which is hinged as by means of hinge 22 to the upper surface of member 11. Member 21 is provided with a clamp-down device 23 which is free-floating with respect to member 21. This free-floating feature is obtained as by means of a plurality of studs which are fixed with respect to member 23 and which pass through orifices 24 in member 21. The device 23 is maintained in spaced relationship with respect to member 21 by means of springs 26. When the handle 21 is swung downwardly about hinge 22, as shown in the dotted line position of Figure 1, the member 23 contacts the light diffusing surface 13 or anything which may be placed thereon and, when member 21 is urged further downwardly the member 23 is forced into tight engagement with the member 13 or anything which may be lying thereon.

In order to hold the negative in the proper position with respect to the light emitting surface 13 I have provided an L-shaped member 30 generally as shown in Figure 2. L-shaped member 30 is provided with a second L-shaped member 31 of very thin material which is adapted to underlie member 30 and to be secured thereto as by means of rivets 32. The purpose of member 31 will be hereinafter more fully described.

Member 30 is also provided with a pair of orifices 33 and 34 which are adapted to cooperate with a pair of upwardly extending pins 36 and 37 respectively on surface 11. Orifices 33 and 34 are only sufficiently larger than pins 36 and 37 that the L-shaped member 30 may move without binding with respect to the pins. At its angle portion, member 30 is provided with an outwardly extending member 38, as shown in Figures 2 and 5, which extends upwardly and at an angle from the general plane of member 30 and which acts as a lever. Generally speaking the member 30 is creased on a line determined by the orifices 33 and 34 (hereinafter called line 33—34) and is adapted to hinge about the fulcrum 35 formed by line 33—34, the orifices 33 and 34 and the pins 36 and 37. It is obvious that the position of the pins 36 and 37 prevents any movement of the member 30 about the axis of either one of them and only permits a hinged action with respect to the surface 11.

The member 30 is also provided with a pair of downwardly extending pins 41 and 42 which pass through similar orifices 43 in the member 11 and which are provided at their lower ends with heads 44 which abut against the spring 46 as shown. When the member 30 is moved about the fulcrum 35, upward movement of the arms of the L is resisted by the springs 46. As a matter of fact the springs 46 are at all times sufficiently compressed to urge the member 30 into close cooperative relationship with respect to the surfaces 11 and 13.

As is shown in Figure 4 the arms of the L-shaped member 30 are slightly bowed between the fulcrum 35 and the extreme ends of the arms. The pressure of the springs 46 upon the pins 41 and 42 tends to overcome the bow in the arms of the L-shaped member 30 and to force the entire lower surface of said arms into close cooperative relationship with the top of the surface 13 and, consequently, likewise force the arms of the member 30 into close cooperative relationship with any object, such as a photographic negative, which may be placed over the member 13 and under the member 30. The pins 42 and 41 passing through the orifices 43 also tend to maintain the alignment of the member 30 with respect to the rest of the apparatus.

When the member 21 is swung to the position shown in dotted lines in Figure 1 it may be urged further downwardly until it contacts a switch member 48. Operation of the switch 48 causes the operation of the lights within the member 10 thereby causing a printing operation.

Operation of the device may be described briefly as follows: The device is generally placed upon a suitable table or bench and is connected to a suitable source of electric current for the operation of the lights within the member 10 by means of operation of the switch 48. The handle 21 is swung to the upward position shown in full lines in Figure 1.

The members 14 and 16 are moved longitudinally and laterally respectively until their inner edges 14a and 16a respectively are in proper position as shown on the scales 31. The measurements shown on the respective scales 31 indicate the size of the "sight" of the picture to be obtained. When the members 14 and 16 have been moved to the proper position to obtain the desired "sight," the photographic negative is placed over the members 13, 14 and 16 and the operator raises the arms of the member 30 by pushing downwardly upon the member 38. As has previously been explained the downward pressure upon member 38 causes the L-shaped member 30 to pivot about the fulcrum 35. When the arms of member 30 are raised the negative may be inserted thereunder. When the negative is properly placed, member 38 is released and the member 30 is allowed to resume its normal position. The novel hinge obtained by use of orifices 33 and 34 and pins 36 and 37 adds a so-called floating effect to the L-shaped member 30. Also the bow in the arms of the L-shaped member and the downward pressure exerted by the springs 46 tends to force the L-shaped member into engagement with the photographic negative along its entire length. It is obvious that the negative would normally be contacted at a point adjacent the ends of the legs of the L-shaped member and also at a point adjacent the angle of the L-shaped member 30. However, downward pressure of springs 46 tends to overcome the natural bow of the arms of the L-shaped member 30 and to urge these arms into engagement with the photographic negative along their entire lengths. The full floating effect of the hinged pivot combination 33, 36 and 34, 37 permits the fulcrum 35 of the L-shaped member to raise or lower itself to accommodate itself with respect to any particular negative.

When the negative has been properly positioned as previously explained it is obvious that the same will be retained in that position so long as the L-shaped member 30 is not disturbed.

A piece of light sensitive photographic paper may then be positioned over the negative. As shown in Figure 3 the L-shaped member 30 and the scale members 31 provide abutments 30a against which an end and side edge of the photographic paper may be placed. The width of the scale member 31 is the conventional margin which is used in photographic printers. Therefore by placing a piece of light sensitive paper against the abutment 30a formed by members 30 and 31 a proper margin on one side and one edge of the print is obtained. The "sight," previously determined, is not altered.

When the light sensitive paper has been positioned as previously described, the member 21 is swung about the hinge 22 to the dotted line position shown in Figure 1. The member 23 contacts the photographic paper previously positioned with respect to the L-shaped member 30 and urges the same into close cooperative relationship with the negative which has previously been placed under the L-shaped member 30 and which is retained thereby. The member 21 may be urged downwardly to the point at which it contacts the switch 48. When the member 21 contacts the switch 48 the lights within the member 10 are caused to light and the photographic printing process takes place. As is well known to those skilled in the art the light must be maintained for a predetermined period of time. After the predetermined period of time has elapsed the pressure upon the member 21 is released and the same swings upwardly out of engagement with the switch 48 thereby turning off the lights within the member 10 and terminating the photographic printing process. The member 21 may then be swung to its uppermost position as shown in full lines in Figure 1 at which time the printing paper will be exposed for removal. By this time the picture has been printed upon the photographic paper and the properly sized "sight" obtained with a proper end and side margin. The other end and side may be trimmed to the proper margin by any suitable cutting medium. However, the negative is still retained in operating position under the L-shaped member 30, and in the event it is desired that a further print be made, no further adjustment of the negative, of the members 14 and 16, or of the L-shaped member 30, or of the side and end margin scale is necessary. Simply by repeating the process heretofore described in conjunction with the first piece of photographic paper one may make a duplicate thereof.

I claim:

1. In a photographic printer in which a negative is adapted to be placed in contact with a light diffusing surface, means for releasably holding the negative in contact with said surface comprising a generally L-shaped member, a pair of pins vertically mounted on said surface adapted to cooperate with a pair of orifices in said member to form a hinge whereby said member may be raised with respect to the plane of said surface, a second pair of pins adapted to cooperate with said member, said pins being provided with springs adapted to urge said member against said light diffusing surface, and a projecting arm set at an angle to the plane of said L-shaped member for raising said L-shaped member with respect to said surface.

2. In a photographic printer in which a negative is adapted to be held in contact with a light diffusing surface, means for releasably holding a negative in contact with said surface comprising a generally L-shaped member pivoted with respect to said surface about a pair of vertically mounted pins adapted to cooperate with said member at the angle of its legs, said legs being slightly bowed between the pivot and their ends remote from said pivot and means comprising a pair of springs surrounding a second pair of pins intermediate said pivot and said ends of the legs tending to overcome the bow of said legs and to urge the same into contact with said surface along their entire length.

3. In a photographic printer in which a negative is adapted to be held in contact with a light diffusing surface, means for releasably holding a negative in contact with said surface comprising a generally L-shaped member pivoted with respect to said surface at the angle of its legs, four spaced pins fixedly mounted adjacent said light diffusing surface, the first pair of pins passing through orifices in said member along the line of the pivotal axis about which said member is raised and the second pair of pins passing through orifices in the legs of said member, said legs being slightly bowed between the pivot and their ends remote from said pivot and spring means intermediate said pivot and the ends of said legs remote therefrom tending to overcome the bow of said legs and to urge the same into contact with said surface along their entire length.

4. In a photographic printer in which a negative is adapted to be held in contact with a light diffusing surface, means for releasably holding a negative in contact with said surface comprising a generally L-shaped member pivoted with respect to said surface at the angle of its legs, means to hold said L-shaped member against lateral movement while permitting said member to be raised with respect to the plane of the light diffusing surface comprising four spaced pins, one pair of pins fixedly mounted and the second pair of said pins projecting through the surface of a frame surrounding the light diffusing surface, the first pair of pins being mounted on the pivotal axis about which said member is raised and arranged to pass through orifices in the L-shaped member along the line of said axis and the second pair of pins being provided with springs and arranged to pass through orifices in the legs of L-shaped member, said legs being slightly bowed between the pivot and their ends remote from said pivot said second pair of pins intermediate said pivot and the ends of said legs remote therefrom tending to overcome the bow of said legs and to urge the same into contact with said surface along their entire length, and said member providing side and end walls for properly aligning a piece of photographic paper with respect to said negative.

FLOYD V. SCHLEIMER.

REFERENCES CITED

The following references are of record in the file of this patent:

UNITED STATES PATENTS

| Number | Name | Date |
| --- | --- | --- |
| 1,103,331 | Wallace | July 14, 1914 |
| 1,159,441 | Wallace | Nov. 9, 1915 |
| 1,275,410 | Erickson | Aug. 13, 1918 |
| 1,902,984 | Barber | Mar. 28, 1933 |
| 2,359,784 | Paulas | Oct. 10, 1944 |